April 14, 1970

G. B. LOPER 3,506,085

PNEUMATIC ACOUSTIC SOURCE EMPLOYING
ELECTROMAGNETIC CONTROLLED VALVE

Filed Aug. 28, 1967

INVENTOR
*George B. Loper*

BY *Arthur J. Zobal*

ATTORNEY

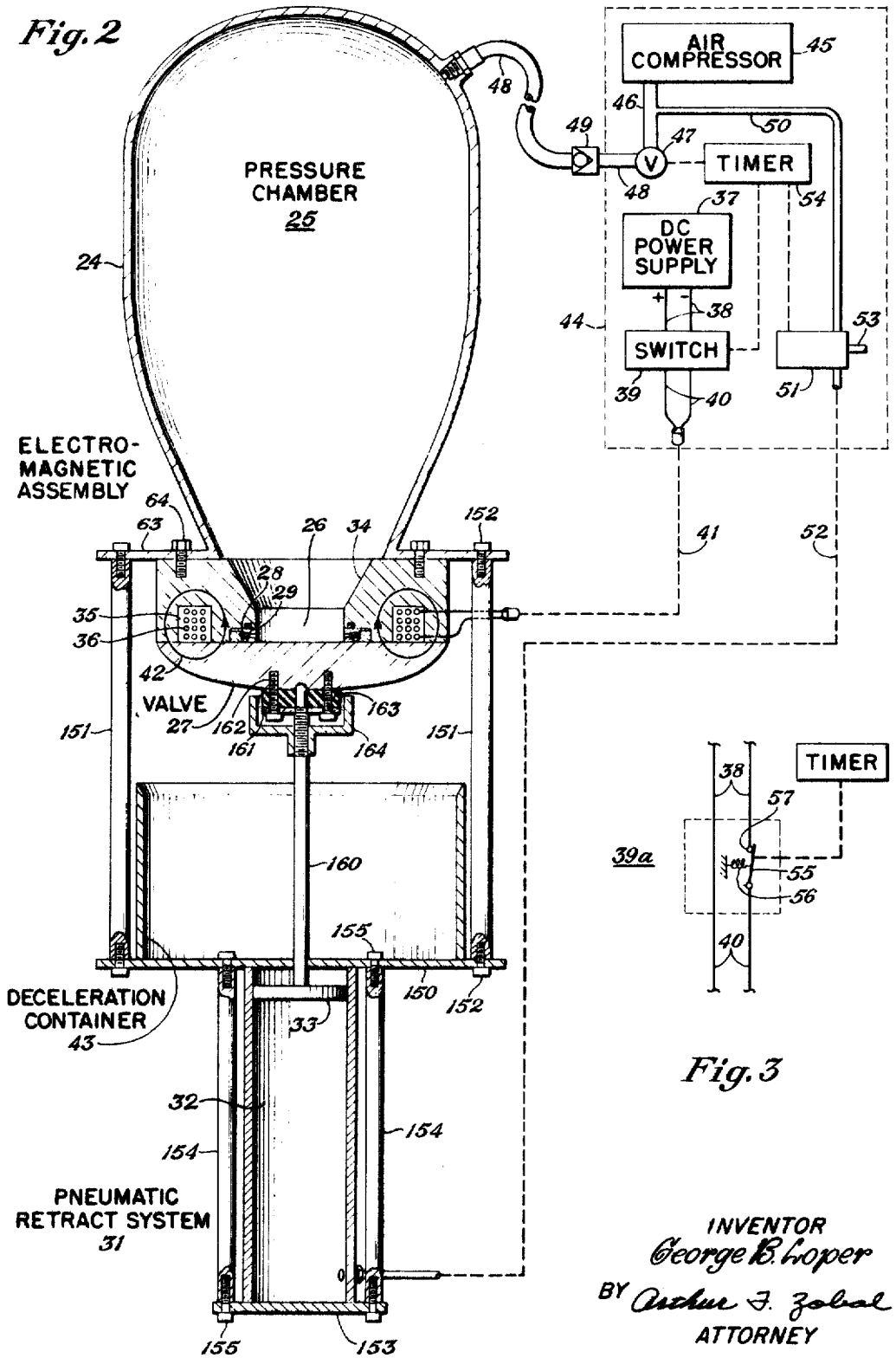

INVENTOR
George B. Loper
BY Arthur F. Zobal
ATTORNEY

INVENTOR
George B. Loper
BY Arthur F. Zobal
ATTORNEY

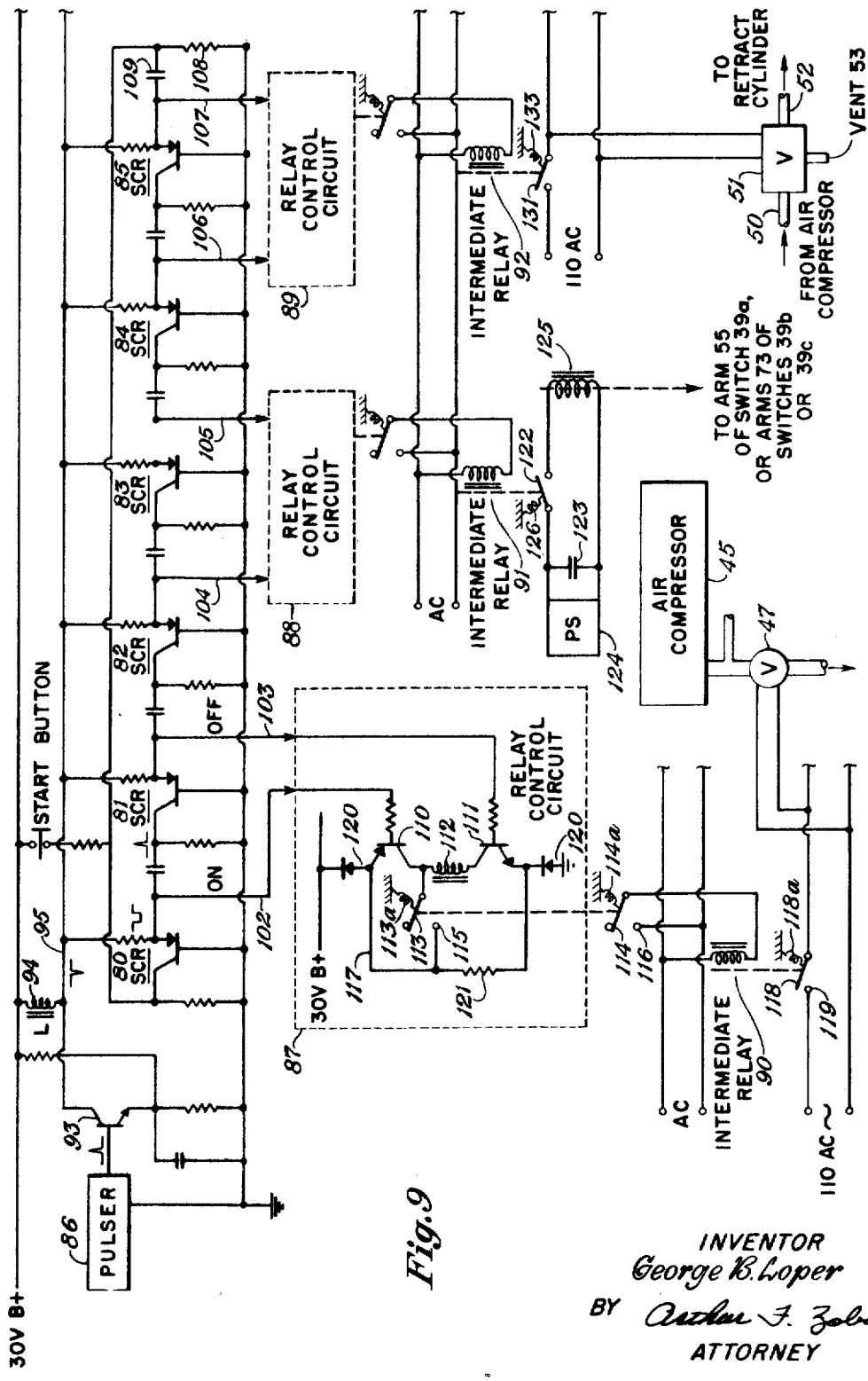

United States Patent Office 3,506,085
Patented Apr. 14, 1970

---

3,506,085
PNEUMATIC ACOUSTIC SOURCE EMPLOYING ELECTROMAGNETIC CONTROLLED VALVE
George B. Loper, Duncanville, Tex., assignor to Mobil Oil Corporation, a corporation of New York
Filed Aug. 28, 1967, Ser. No. 663,800
Int. Cl. G01v *1/38, 3/00, 1/00*
U.S. Cl. 181—.5          36 Claims

ABSTRACT OF THE DISCLOSURE

The specification discloses a repetitive marine seismic source formed by a rigid chamber for confining high pressure gases and having a controllable valve of magnetic material for rapidly releasing the high pressure gases through an outlet port into the water to generate an acoustic pulse. An electrical coil supported adjacent the outlet port is energized to form a magnetic force for application to the valve for holding the valve in its closed position against the pressure in the chamber. Current to the coil is controlled by a switching arrangement to render the force ineffective to hold the valve closed against the gas pressure thereby allowing the gas pressure within the chamber to move the valve to an open position to release the gas into the water for the generation of an acoustic pulse.

BACKGROUND OF THE INVENTION

This invention relates to a novel arrangement in a marine acoustic source for controlling a quick-acting valve employed to release pressurized gas from a chamber to generate an acoustic pulse.

In recent developments in marine seismic surveying, pneumatic acoustic sources have been employed to generate acoustic signals in water by the rapid release of pressurized gas from a chamber. These sources generally employ spool-shaped valves, one rim of which opens and closes an outlet port through which the pressurized gas is released and the other rim of which is used for control purposes employing pressurized gas.

In one known source, the control rim is supported for movement within the chamber of the source. In the closed position of the valve, gas pressure in the chamber acts on the control rim to maintain the valve closed. In addition the control rim cooperates with a seal to form a control region sealed from the high gas pressure in the main chamber. Actuation of the valve is accomplished by increasing the pressure in the control region to move the valve to a position to disengage the seal. At this point, the high gas pressure in the main chamber acts on an increased area of the valve to move the valve rapidly to an open position to release the high gas pressure into the water for generating an acoustic pulse.

SUMMARY OF THE INVENTION

In accordance with the present invention, there is provided a repetitive pneumatic acoustic source for marine seismic operations and having a magnetic valve holding and control system for the source's gas pressure release valve. The source comprises a chamber formed of rigid wall structure having a first end and an outlet port spaced from the first end to be coupled to water. Movable valve means or armature means comprising magnetic material, such as ferromagnetic material, is supported for movement between a closed position and an open or a porting position for closing and opening the outlet port. When the valve is in its closed position, supply means introduces a fluid into the chamber to form a high gas pressure therein. Means is provided for applying a magnetic field to the valve's magnetic material for forming a magnetic force for holding the valve in its closed position against the force of the high gas pressure within the chamber. In addition, means is employed for reducing the effect of the magnetic force on the valve for rendering the magnetic force ineffective to hold the valve in its closed position to allow the high gas pressure in the chamber to move the valve to its open position to release the gas rapidly into the water to generate an acoustic pulse.

In the embodiment disclosed, an electrical coil is supported to surround the outlet port. The valve is moved adjacent to the electrical coil when moved to its closed position. The coil is energized to form the magnetic field which is applied to the valve to form the magnetic holding force. When it is desired to actuate the valve to generate an acoustic pulse, current to the coil is controlled by a switching arrangement to reduce the magnetic holding force thereby allowing the high gas pressure to move the valve rapidly to its open position for release of the high pressure gas into the water.

BRIEF DESCRIPTION OF THE DRAWINGS

FIGURE 2 is an enlarged cross-sectional view of the acoustic source with its quick-acting valve in a closed position;

FIGURE 3 illustrates one type of switch used to control the operation of the acoustic source;

FIGURE 9 illustrates detailed circuitry of a timing and switching arrangement which may be employed to operate the source.

DETAILED DESCRIPTION OF THE INVENTION

Figure 1:
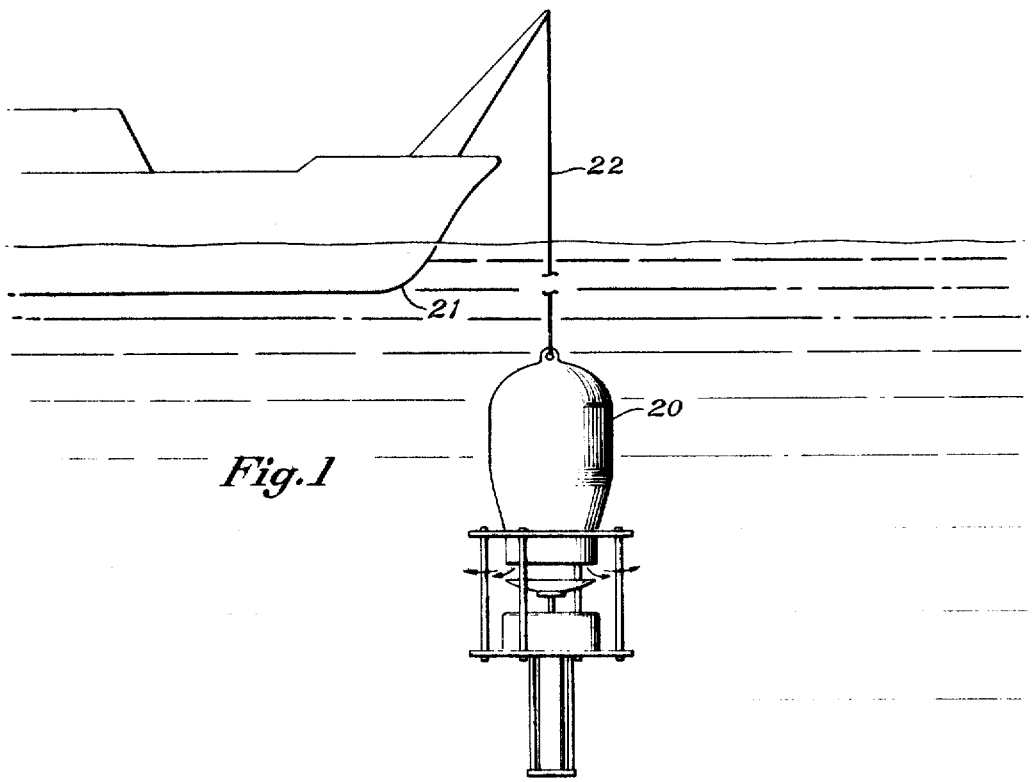
FIGURE 1 illustrates the pneumatic acoustic source of the present invention in the environment in which it is to be used.
Figure 4:
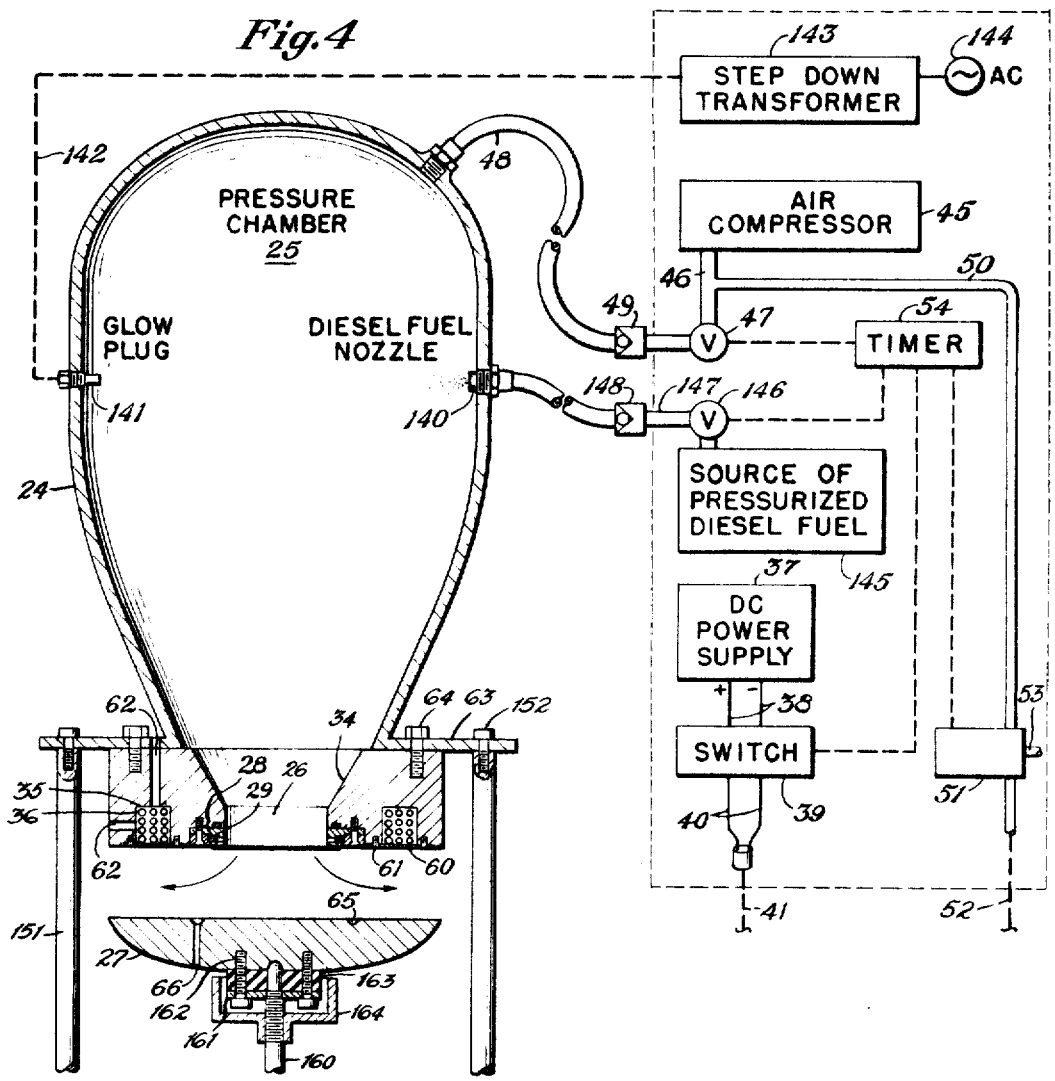
FIGURE 4 is a partial cross-sectional view of another embodiment of the acoustic source showing its valve in a partial open position.

Referring now to FIGURE 1, the acoustic source 20 of the present invention is shown supported in water from a boat 21 by a cable arrangement 22. As can be seen from FIGURE 2, the acoustic source comprises enclosing wall structure 24 forming a pressure chamber 25 and which has an outlet port 26 at the lower end to be coupled to water. A quick-opening valve 27 is provided for opening and closing the outlet port. When the valve is in a closed position, the chamber is pressurized with high gas pressure. Ring-shaped seal 28, comprising a resilient member and located in slot 29, seals the outlet port. At a desired time, the valve 27 is actuated for sudden downward movement, as illustrated in FIGURES 1 and 4, to allow the high gas pressure to escape rapidly into the water by way of the outlet port 26 to generate an acoustic pulse.

The quick-acting valve 27 is made of magnetic material, such as mild steel. It is supported by a retract system 31, including cylinder 32 and piston 33, for movement to a closed position adjacent structure 34 forming the outlet port 26. Structure 34 is constructed of magnetic material, preferably mild steel. Positioned within ring-shaped slot 35, formed in structure 34, and surrounding the outlet port is an electrical coil 36. This coil, along with structure or core 34, forms an electromagnet. In the operation of the source, coil 36 normally is energized by current applied thereto from DC source 37, leads 38, normally closed switch 39, and leads 40 of cable 41. This current produces a magnetic field as illustrated at 42. This field in turn produces or develops a magnetic force which is applied to and acts on the valve when it is in its closed position to hold the valve closed against the gas pressure within the chamber 25. When it is desired to actuate or trigger the valve 27 to generate an acoustic pulse, switch 39 is actuated, for example merely to interrupt the flow of current to the coil, to allow the magnetic field and resulting force to decay to a level insufficient to hold the valve in its closed position against the pressure in the chamber 25. At this point the high gas pressure in the chamber then moves the valve 27 rapidly downward to its open position for release into the water to generate an acoustic pulse. Water in container 43 slows the valve 27 at the end of its opening movement. Following the generation of an acoustic pulse, retract mechanism 31 moves the valve 27 to its closed position for a repeat cycle.

As now can be understood, the present source with its magnetic valve control system has advantages due to its simplicity. By applying the magnetic field and hence the magnetic holding force directly to the valve, for control purposes, the number of mechanical working parts is reduced and the inertia of moving parts is minimized.

The chamber pressurizing system, power supplies, and control instrumentation are located on the tow boat and are illustrated in the dashed box 44. The chamber pressurizing system, n one emboidiment, may comprise an air compressor only, illustrated at 45 in FIGURE 2 or, in another embodiment, an arrangement for forming a combustible mixture of diesel fuel and air which is ignited and burned in the chamber. The first embodiment is illustrated in FIGURE 2. In this embodiment, air compressor 45 is coupled to the chamber 25 by way of conduit 46, valve 47, and conduit 48, including check valve 49. The air compressor 45 also is coupled to the retract cylinder 32 by way of conduit 46, conduit 50, three-way valve 51, and conduit 52. Valve 47 is a normally closed solenoid controlled valve while valve 51 is a solenoid controlled valve which normally vents retract cylinder 32 to the atmosphere by way of conduit 52 and vent 53. A timer 54 controls both valves 47 and 51 and, in addition, switch 39 which in its simplest form comprises a movable arm 55 normally biased, by spring 56, to contact terminal 57 as illustrated by the switch 39a in FIGURE 3.

The sequence of operation during one cycle will now be described in the embodiment employing only compressed air and the switch of FIGURE 3. In the beginning of this cycle, it is assumed that an acoustic pulse has been generated and the valve 27 has been moved to its closed position. At this time both valves 47 and 51 are in their normal states whereby the flow of air to chamber 25 and to cylinder 32 is blocked and, in addition, cylinder 32 is vented to the atmosphere. In addition, arm 55 of switch 39a is in its normal position and contacts terminal 57 whereby DC current is applied to the coil 36 to produce the magnetic holding force for holding the valve 27 closed. Timer 54 first causes valve 47 to open to allow air to flow into the chamber 25. After the chamber 25 has been pressurized to the desired value, timer 54 allows the valve 47 to close to block the flow of air into the chamber 25. Next, timer 54 causes arm 55 of switch 39a to move to a position away from terminal 57 to interrupt the flow of current to the coil 36 and thereby de-energize the coil. This allows the magnetic field to decay whereby the pressure in the chamber 25 may move the valve to its open position for release of the air into the water. After the valve 27 has opened and the gas pressure in chamber 25 released, timer 54 allows arm 55 of switch 39a to be moved to its normal position contacting terminal 57 to create again the electromagnetic holding force. At about the same time, timer 54 controls valve 51 to block vent 53 and allow air to flow into retract cylinder 32 by way of conduits 50 and 52. The pressurized air in cylinder 32 acts on piston 33 to move the piston and hence the valve 27 upward to its closed position where the magnetic holding force holds it closed. Timer 54 then causes valve 51 to block the flow of air through conduit 50 and to vent cylinder 32 to the atmosphere by way of conduit 52 and vent 53.

The source 20 and valve assembly may be constructed to withstand and hold various chamber pressures. In one embodiment, the chamber 25 has a volume of 1.3 cubic feet. Chamber structure 24 is of soft iron while core 34 and valve 27 each is of solid mild steel as indicated above. Core 34 and valve 27 are circular in shape and have exterior diameters of about ten inches, respectively. The maximum thickness of these members is about three inches and 1¾ inches, respectively. The port 26 at its lower end has a diameter of three inches. Slot 35 is about one inch square in cross sections spaced about 1¾ inches from the port 26. Coil 36 has 200 turns of 16 gauge copper wire and draws 4 amps at about 8 volts DC from source 37. The force developed by this coil is sufficient to hold the valve 27 closed against gas pressures up to about 500–650 p.s.i. for the source having the dimensions mentioned above. Coils of different ampere-turns may be employed in sources of different sizes and configurations to hold pressures at different values.

Coil 36 may be secured within the slot 35 by an encapsulating epoxy or by a thin nonmagnetic holding ring, illustrated in FIGURE 4 at 60, and secured to structure 34 by machine screws 61. In addition, vents 62 extending from slot 35 to the outside environment may be employed to release air trapped within the slot 35. In the sources disclosed in FIGURES 2 and 4, core 34 is secured to chamber structure 24 by way of rim 63 welded to chamber structure 24 and a plurality of bolts 64 threaded through rim 63 and into core 34. A seal, not shown, may be provided between rim 63 and core 34 to assure adequate sealing.

Although shown only in the embodiment of FIGURE 4, an arrangement is provided for preventing gas pressure leaking past the seal 28 from prematurely causing the valve 27 to open. This arrangement comprises an annular slot 65 and a plurality of apertures 66 extending from the slot 65 through the valve 27 to its back side. Slot 65 is formed in the top surface of the valve 27 and surrounds but is spaced from the area of the valve's top surface which contacts the seal 28. Gas, which leaks past the seal 28 when the valve is closed and the chamber pressurized, flows into slot 65 and through apertures 66 and hence is channeled away from the valve's outer surface area outside the circumference of the seal and the slot. This prevents the formation of additional downward force on the valve's outer surface which may otherwise cause it to open prematurely.

In the embodiment described above, there is a delay in the release of the valve 27 from the electromagnet after it is turned off. This delay is believed to be caused primarily by remanent magnetism in the iron and in addition by eddy currents. Both of these phenomena delay the time when the magnetization or magnetic field reduces to a value where the gas pressure forces the valve open. Hence the time of opening varies with the gas pressure in the chamber. This does not affect the output from the source, but does require compensation either in the recording or the processing of the seismic data.

Figure 5:
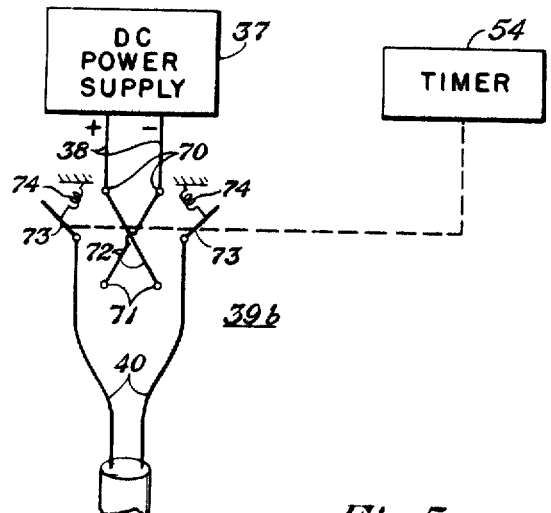
FIGURES 5 and 6 illustrate alternative switches for controlling the acoustic source.

The delay in opening due to the remanent magnetism may be reduced by reversing the connection of the coil 36 to the DC source 37 or by reversing the connection to a voltage source of increased but opposite polarity upon switching. As can be understood, the magnetization of the iron lags the change in current in the circuit. Thus, when the arm 55 of switch 39a is opened to interrupt the flow of current to coil 36, remanent magnetism exists in the iron. The switching alternatives illustrated in FIGURES 5 and 6, however, remove the remanent magnetism thereby affording more prompt release of the valve. In the switch 39b of FIGURE 5, the leads 38 of DC power supply 37 are connected to terminals 70 which in turn are connected to terminals 71 by leads 72. Normally arms 73 are biased by springs 74 to contact terminals 70 whereby current of one polarity is applied to the coil 36. When it is desired to release the valve 27 to generate an acoustic pulse, timer 54 causes arms 73 to disengage terminals 70 to interrupt the flow of current and then to rapidly engage terminals 71 to apply a current of opposite polarity to the coil 36. After release of the gas pressure, timer 54 then allows arms 73 to be biased back to their normal positions, contacting terminals 70.

Figure 6:
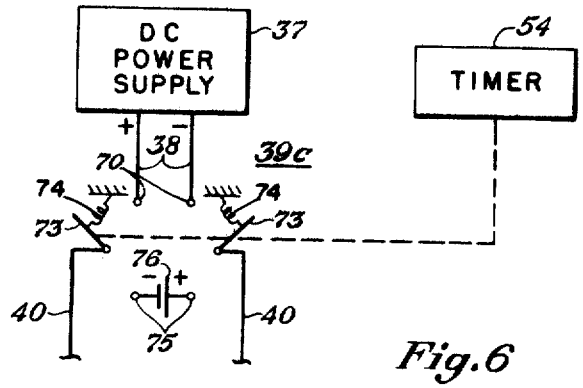

In the alternative switch 39b of FIGURE 6, arms 73 also normally are biased by springs 74 to contact terminals 70 whereby the output from supply 37 is applied to the coil 36 in a first direction. When it is desired to release the valve 27 to generate an acoustic pulse, timer 54 causes arms 73 to contact terminals 75 whereby the output from DC source 76 is applied in a reverse direction to the coil 36. The source 76, however, is a larger source which may supply, for example, 48 volts at 30 amps to the coil 36 for decreasing the remanent magnetism at an even higher rate.

Figure 7:
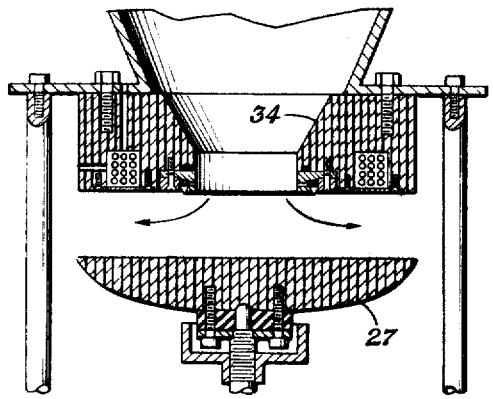
FIGURE 7 is a cross-sectional view of a portion of the source illustrating laminated members forming the electromagnetic assembly of the source and its fast acting valve.

In the embodiments described above, wherein the electromagnetic core 34 and the valve 27 are of solid mild steel, the collapsing magnetic field, which occurs when the switch is opened or reversed, creates eddy currents in the steel which oppose and delay the moment when the field reduces to a point that the gas pressure forces the valve open. In order to reduce this delay even more, the electromagnetic core 34 and the valve 27 may be laminated, as shown in FIGURE 7. In this embodiment, the generation of eddy currents is greatly reduced by the laminations when the current to the coil is turned off or reversed, allowing the flux, and therefore the holding force, to change rapidly and to reduce the delay time.

One method of laminating members 34 and 27 is to spirally wind flat steel ribbons and machine the members from the wound steel coils. The layers are insulated from each other, for example, by normal oxide coating, and are assembled to avoid external connections between the inner and outer ends of the ribbon to avoid the flow of eddy currents. A suitable clamping arrangement may be employed to hold the laminated structure together.

Figure 8:
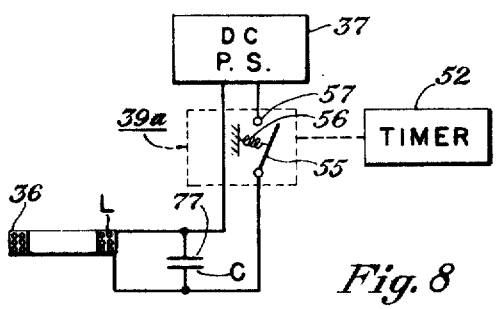
FIGURE 8 illustrates a modified arrangement for providing oscillation and reversal of the magnetic flux to assure rapid release of the fast acting valve.

In the embodiment employing a laminated core 34 and valve 27, the circuit of FIGURE 8, rather than a reversing switch, may be employed to reduce the remanent magnetism. In this circuit, capacitor 77 is connected in parallel across the coil 36 and forms a resonating circuit with the inductance L of the coil. In the operation of this embodiment, arm 55 of switch 39 normally is closed to form the magnetic holding force for holding the valve 27 closed. When arm 55 opens to disengage terminal 57, current in the coil 36 oscillates in the circuit comprising the L and C. The current quickly decays through zero and reverses, thereby removing remanent magnetism and allowing a quick release of the valve 27. The embodiment of FIGURE 8 is employed preferably only with the source having the laminated core 34 and laminated valve 27 so that the resonant action of the coil and capacitor is not over-damped by eddy currents in the steel.

In one embodiment, the timer 54 employed for controlling the operation of the instrumentation may be a mechanical type of timer comprising a rotating shaft for driving a plurality of cams for controlling various switching operations. In the preferred embodiment, however, the timer is an electronic timer, one type of which is illustrated in FIGURE 9. This timer is a ring counter comprising a plurality of silicon controlled rectifiers illustrated at 80–85 and controlled by pulser 86. The silicon controlled rectifiers produce on-off signals for controlling relay control circuits, three of which are illustrated at 87–89. Circuit 87 controls an intermediate relay 90 which in turn controls the solenoid operated valve 47. Circuit 88 controls an intermediate relay 91 which controls the switch 39. In addition, circuit 89 controls intermediate relay 92 which in turn controls the three-way valve 51. Intermediate relays 90–92 are employed to protect the small relays of circuits 87–89 from the larger currents and voltages drawn by the larger coils which are employed to actuate valves 47, switch 39, and valve 51, respectively.

In the operation of the system, the silicon controlled rectifiers (SCR's) 80–85 normally are off. In addition, transistor 93, which is a driver stage, normally is non-conducting. The start button first is momentarily closed to apply current from the B+ conductor to SCR 80. This causes the SCR to conduct. Pulser 86, which may be a unijunction transistor, produces output pulses which are applied to transistor 93. Choke 94 has a high impedance to a pulse but low impedance to DC. Thus, when any one SCR is conducting DC, there is very little voltage drop across the choke and the voltage on common lead 95 is near that of B+. When a pulse from the pulser 86 is applied to the transistor 93 it conducts for the duration of the pulse with current flowing through the choke. As the choke impedance is high for a short pulse, the voltage on lead 95 drops to a low value. This causes the voltage at all SCR anodes to drop very low since they are all connected to lead 95. The SCR, which is conducting at the time, turns off since it has lost its anode voltage. The voltage on lead 95 quickly rises back to B+ as the pulse terminates, but the SCR does not turn back on. However, the next adjacent SCR on the right does turn on because its gate is driven positive by the capacitor which connects it to the anode of the previous SCR. Thus each pulse from pulser 86 turns the conducting SCR off which results in the next adjacent SCR being turned on, whereby SCR's 80–85 are turned on and off in succession to produce a series of control outputs which are applied to circuits 87–89 by way of conductors 102–103, 104–105, and 106–107, respectively. The output at the juncture of resistor 108 and capacitor 109 is applied back to SCR 80 to recycle the timer.

Referring to the relay control circuits 87–89, since all of these circuits are similar, only circuit 87 will be described. This circuit comprises a transistor 110 which is normally off and a transistor 111 which is normally in a state whereby it is capable of conducting. The output pulse from conductor 102 causes transistor 110 to conduct thereby energizing solenoid coil 112. This causes ganged switches 113 and 114 to be moved downward to contact terminals 115 and 116, respectively. Current then flows through solenoid 112 from B+ by way of conductor 117, terminal 115, and switch 113 to hold the solenoid in its energized position. Movement of switch 114 to contact terminal 116 causes intermediate relay 90 to be energized which in turn moves switch 118 to contact terminal 119, thereby energizing the solenoid of control valve 47 to allow air from compressor 45 to flow to the pressure chamber 25.

The output from conductor 103 next turns transistor 111 off, thereby interrupting the current flow through solenoid 112. Switches 113 and 114 are then returned to their normal states by springs 113a and 114a, thereby de-energizing solenoid 90. Switch 118 then is allowed to return to its normal open position by spring 118a thereby causing valve 47 to be de-energized to block the flow of air to the chamber 25.

In circuit 87 diodes 120 are Zener diodes which are biased by resistor 121 so that they break down and conduct with low impedance and about three volts drop across each. They serve to assure that transistors 110 and 111 are in the off condition when their base leads, 102–103, are properly biased by the SCR's 80–81, respectively.

The next output from conductor 104 causes circuit 88 to actuate relay 91 to close normally open switch 122. This allows capacitor 123, charged from power supply 124, to discharge through the coil of relay 125 and to energize the coil rapidly and at a precise time, thereby opening arm 55 of switch 39a or reversing arms 73 of switches 39a or 39c quickly and precisely at the desired moment.

The next output from conductor 105 causes circuit 88 to de-energize solenoid 91, thereby allowing spring 126 to open switch 122 which in turn allows the arms of switches 39a, 39b, or 39c to be moved to their normal positions.

The output from conductor 106 causes relay 92 to be energized thereby closing switch 131. This allows current to be applied to the coil of valve 51 to block vent 53 and allow air from the air compressor to pass to the cylinder 32 by way of conduit 50 and conduit 52. The last output from conductor 107, as can be understood, causes relay 92 to be de-energized whereby spring 133 opens switch 131 returning valve 51 to its normal condition, venting the retract cylinder 32.

Although only six silicon controlled rectifiers have been illustrated, in practice there are twenty which are turned on in succession during each cycle by the operation of the pulser 86. While conductors 102–107 are shown with fixed connection to the anodes of SCR's 80–85, respectively, in reality, by means of selector switches the conductors which operate the on and off states of the relay control circuits may be connected to any chosen anode of any SCR so as to afford great flexibility in choosing the actuating times of the various valves and switches. In addition, the pulser 86 can be adjusted to produce output pulses at different repetition rates to vary the cycle of operation. In one embodiment the timer is adjusted to operate the acoustic source 20 to produce acoustic pulses at a repetition rate of one pulse every six seconds.

Figure 10:
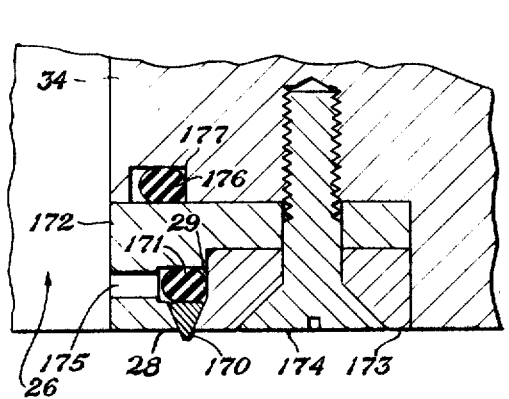
FIGURE 10 illustrates a portion of a preferred seal arrangement employed at the lower end of the source.

Although the timer described in the system of FIGURE 10 employed silicon controlled rectifiers, it is to be understood that a similar type of ring counter could be emplyoed utilizing multivibrators.

Referring again to FIGURE 4, there will be described briefly the embodiment wherein the source is pressurized by the ignition of a diesel fuel mixture injected into or formed in the chamber 25. This arrangement comprises a diesel fuel nozzle 140 for spraying diesel fuel into the chamber 25 and a glow plug 141 which is continuously energized by current applied thereto by conductor 142 extending from step-down transformer 143, coupled to AC supply source 144. Diesel fuel is applied to nozzle 140 from source 145, solenoid controlled valve 146, conduit 147, and check valve 148. Valve 146 normally is maintained in a closed position to block the flow of fuel to nozzle 140. In a cycle of operation, air is injected into the chamber 25 as described above for pressurizing the chamber. After the chamber has been pressurized with air, timer 54 opens valve 146 for a short period of time whereby diesel fuel is sprayed into the chamber toward glow plug 141. The diesel fuel mixes with the pressurized air and is ignited by the glow plug. After a short period of time, the timer 54 next allows valve 146 to close to block the flow of diesel fuel to the nozzle 140. The remaining sequence of operation is the same as that described in connection with the embodiment of FIGURE 2.

Referring again to FIGURE 2, there will be described other structural features of the source. Deceleration container 43 is a cylindrical member having an interior diameter slightly larger than the exterior diameter of valve 27. The cylindrical walls of container 43 are welded to circular bottom plate 150 which, in turn, is supported by a plurality of spaced rods 151, coupled to rim 63 and to plate 150 by way of bolts illustrated at 152. As the valve 27 moves downward the water within the container 43 is squeezed upward between the exterior diameter of the valve 27 and the interior diameter of the container to decelerate the valve.

The cylindrical wall structure of retract cylinder 32 is welded to the bottom surface of plate 150 and to the top surface of plate 153. Plate 153, in turn, is supported by a plurality of spaced rods 154, coupled to plate 150 and to plate 153 by way of bolts illustrated at 155.

Valve 27 is coupled to retract piston 33 by way of coupling rod 160. The lower end of rod 160 is welded to piston 33 while its upper end is secured to valve 27 with a flexible coupling arrangement to provide a cushioning effect and to avoid the necessity of high precision of alignment of parts. The flexible coupling arrangement comprises a circular plate 161 threaded to the upper end of rod 160 and which also is coupled to valve structure 27 by way of bolts 162. The apertures in plate 161 through which the bolts 162 extend are larger than the stems thereof whereby the plate 161 can move relative to the bolts 162. A resilient member 163 is inserted between the plate 161 and the valve 27. The upper end of rod 160 pivots in a rounded aperture formed in the lower surface of the valve 27. Cup-shaped member 164 is threaded to the upper end of rod 160 and is provided to prevent excessive angular movement between the rod 160 and the valve 27.

The seal 28 for the source in one embodiment comprises a stainless steel ring 170 and a resilient elastomer O-ring 171 (see FIGURE 10) located in the slot 29. This slot is formed by metal holding rings 172 and 173 secured to the magnetic core structure 34 by bolts illustrated at 174. A plurality of spaced radially extending channels 175 extends from the pressure chamber region to the slot 29 whereby pressurized gas is applied to the slot 29 for effecting a seal between the elastomer O-ring 171, the walls of the slot 29, and the metal seal ring 170 and between the metal ring 170 and the top surface of valve 27. Resilient O-ring 176 located in slot 177 provides a seal betwen ring 172 and structure 34.

In the preferred embodiment, the elastomer O-ring 171 is of the heat resistant type. In the source employing diesel fuel increased protection for the elastomer O-ring, from the hot gases formed in the chamber can be obtained by providing a labyrinth for cooling the hot gases before application to the slot 29 similar to that described in copending application, Seal for Pneumatic Acoustic Source, Ser. No. 663,664, by Ellis M. Brown et al., filed on Aug. 28, 1967 and assigned to the same assignee as the present invention.

What is claimed is:

1. A source for generating acoustic energy for ultimate application to the earth for exploratory purposes comprising:

a chamber for receiving gas and holding gas under pressure to be released for the generation of an acoustic pulse, said chamber being formed of rigid wall structure having a first end and an outlet port means spaced from said first end, armature means supported for movement between a closed position and a porting position, electromagnet means for applying a magnetic field to said armature means for forming a magnetic force for holding said armature means in its closed position for confining pressurized gas in said chamber, means for decreasing said magnetic force for movement of said armature means to its porting position for releasing pressurized gas from said chamber to generate an acoustic pulse, and means for moving said armature means to its closed position following the generation of an acoustic pulse.

2. A source for generating acoustic pulses in water for exploratory purposes comprising:

a chamber formed of rigid wall structure having a first end and an outlet port means spaced from said first end to be coupled to water, armature means supported for movement between a closed position and a porting position, means for introducing a pressurizing fluid into said chamber to form a high gas pressure in said chamber, an electrical coil located to apply a magnetic field to said armature means thereby forming a magnetic force to hold said armature means in its closed position for confining said high gas pressure in the chamber, a source of electrical energy, control means for controlling the application of electrical energy from said source of electrical energy to said coil for energizing said coil to create said magnetic force to hold said armature means closed and for rendering said magnetic force ineffective to hold said armature means closed against the force of said high gas pressure in said chamber for movement of said armature means to its porting position for release of said high gas pressure into the water to generate an acoustic pulse, and retract means for moving said armature means to its closed position following the generation of an acoustic pulse.

3. The acoustic source of claim 2 wherein:

said means for introducing said pressurizing fluid comprises an air compressor.

4. The acoustic source of claim 2 wherein:

said fluid introduced into said chamber comprises pressurized air, means for introducing diesel fuel into said chamber for forming a combustible mixture in said chamber, and means for igniting said combustible mixture to form said high gas pressure in said chamber.

5. An acoustic source for generating acoustic pulses in water for exploratory purposes comprising:

a chamber for receiving gas and holding gas under pressure, said chamber being formed of rigid wall structure and having an outlet port, valve means supported for movement between a closed position, and a porting position for confining and releasing pressurized gas, said valve means being movable by pressurized gas in said chamber to said porting position for release of pressurized gas from said chamber by way of said outlet port to generate an acoustic pulse in water, means for returning said valve means to its closed position following the generation of an acoustic pulse, and an electromagnet for applying to said valve means a magnetic holding force in opposition to forces applied to said valve means by pressurized gas in said chamber.

6. The acoustic source of claim 5 wherein:

said electromagnet comprises an electrical coil, said acoustic source having associated therewith a source of electrical energy for energizing said coil for forming said magnetic holding force, and control means for controlling the application of electrical energy from said source of electrical energy to said electrical coil.

7. The acoustic source of claim 6 wherein:

said electromagnet and said valve means each comprise laminated layers of magnetic material electrically insulated from each other.

8. The acoustic source of claim 7 comprising:

a capacitive means coupled in parallel to said electrical coil.

9. A source for generating acoustic pulses in water for exploratory purposes comprising:

a chamber formed of rigid wall structure having a first end, structure forming an outlet port spaced from said first end to be coupled to water, movable valve means supported for movement between a closed position and an open position for closing and opening said outlet port, respectively, and means for pressurizing said chamber with high gas pressure when said valve means is in a closed position, said valve means comprising magnetic material, said structure forming said outlet port comprising a controllable electromagnet for applying a magnetic holding force to said valve means to hold said valve means closed against said high gas pressure in said chamber and for decreasing said holding force to allow said high gas pressure to move said valve means to its open position to release said high gas pressure rapidly into the water to generate an acoustic pulse.

10. The acoustic source of claim 9 wherein:

said structure adjacent said outlet port surrounds said outlet port and extends radially outward therefrom forming a first surface facing said valve means, said valve means having a surface area substantially larger than the area of said outlet port and facing said port and said first surface, seal means located between said two surfaces and surrounding said outlet port for sealing said port when said valve means is in a closed position, and means including a plurality of apertures extending through said valve means outside the circumference of said seal to channel gas pressure leaking past said seal means away from said surface area of said valve means outside the circumference of said seal means to prevent leaking gas from prematurely opening said valve means.

11. An acoustic source for generating acoustic pulses in water for exploratory purposes comprising:

a chamber formed of rigid wall structure having a first end and an outlet port means spaced from said first end to be coupled to water, said wall structure adjacent said outlet port means being formed of magnetic material, movable valve means supported for movement between a closed position adjacent said magnetic material and an open position away from said magnetic material for closing and opening said outlet port means, respectively, means for introducing a fluid into said chamber when said valve means is in its closed position to form a high gas pressure in said chamber, said valve means comprising magnetic material movable adjacent said magnetic material of said wall structure when said valve means is in said closed position, an electrical coil for applying a magnetic field to both of said magnetic materials to form a magnetic force for holding said valve means in its closed position against the force of said high gas pressure in said chamber, switch means for applying current to said coil in a first direction to energize said coil to form said magnetic holding force for holding said valve means closed, means for controlling said switch means to apply electrical current to said coil in an opposite direction to allow said magnetic force to decay rapidly to a magnitude ineffective to hold said valve means closed closed whereby said high gas pressure in said chamber may move said valve means rapdily to its open position for release of said high gas pressure into the water to generate an acoustic pulse, and means for returning said valve means to its closed position following the generation of an acoustic pulse.

12. The acoustic source of claim 11 comprising:

a source of electrical energy, said switch means coupling said source of electrical energy to said coil for applying current to said coil in a first direction for energizing said coil, said control means causing said switch means to couple said source of electrical energy to said coil in a manner to apply current to said coil from said source means in an opposite direction.

13. The acoustic source of claim 11 comprising:

first and second sources of electrical energy, said second source producing a higher electrical potential than said first source, said switch means being positioned to couple said first and second sources of electrical energy to said coil separately for applying current to said coil sequentially in opposite directions.

said control means causing said switch means to couple said first source to said coil for energizing said coil for producing said magnetic holding force and sequentially causing said switch means to de-couple said first source and to couple said second source to said coil 14. The acoustic source of claim 11 wherein:

said magnetic materials forming said wall structure adjacent said port and said valve means are of laminated layers of magnetic material electrically insulated from each other.

15. An acoustic source for generating acoustic pulses in water for exploratory purposes comprising:

a chamber for receiving gas and holding gas under pressure to be released for the generation of an acoustic pulse, said chamber being formed of rigid wall structure to be immersed in water, said source having a first end and an outlet port spaced from said first end, movable valve means supported for movement between a closed position and an open position for closing and opening said outlet port, respectively, said valve means preventing the release of pressurized gas from said chamber when said valve means is in said closed position, an electromagnet for applying a magnetic holding force to said valve means to prevent said valve means from moving from said closed position to said open position, said electromagnet being controllable to decrease said holding force for movement of said valve means to said open position for releasing pressurized gas from said chamber by way of said outlet port to generate an acoustic pulse in water, and means for returning said valve means to said closed position following the generation of an acoustic pulse.

16. The acoustic source of claim 15 wherein:

said valve means is supported for linear movement between said open and closed positions.

17. The acoustic source of claim 15 wherein:

said valve means comprises valve structure movable for opening and closing said outlet port, said valve structure being supported for movement toward said electromagnet when said valve means is moved to said closed position, said valve structure being supported for movement in a direction away from said electromagnet when said valve means is moved to said open position.

18. The acoustic source of claim 17 wherein:

said valve structure is formed of magnetic material and is supported to abut against said electromagnet when said valve means is moved to said closed position, said magnetic holding force being applied to said valve structure when said valve structure and hence said valve means is in said closed position for preventing said valve structure and hence said valve means from moving to said open position, said electromagnet being located at a position spaced from said first end of said source and between said first end and said valve structure.

19. An acoustic source for generating acoustic pulses in water for exploratory purposes comprising:

a chamber for receiving gas and holding gas under pressure to be released for the generation of an acoustic pulse, said chamber being formed of rigid wall structure to be immersed in water, said chamber having a first end and an outlet port spaced from said first end, movable valve means supported for movement between a closed position and an open position for closing and opening said outlet port, respectively, said valve means preventing the release of pressurized gas from said chamber when said valve means is in said closed position.

said valve means comprising magnetic material, an electromagnet, including an electrical coil, coupled to said wall structure at a position spaced from said first end, said outlet port extending through said electromagnet, said electromagnet being responsive to current flow through said coil for applying a magnetic holding force to said valve means to prevent said valve means from moving from said closed position to said open position, said electromagnet being responsive to a decrease in current flow through said coil to decrease said holding force to allow pressurized gas in said chamber to move said valve means rapidly to said open position for release of pressurized gas from said chamber by way of said outlet port to generate an acoustic pulse in water, and means for returning said valve means to said closed position following the generation of an acoustic pulse.

20. The acoustic source of claim 19 wherein:

said valve means is supported to allow pressurized gas to flow from said chamber by way of said outlet port and between said electromagnet and said valve means when said valve means is moved to said open position.

21. An acoustic source for generating acoustic pulses in water for exploratory purposes comprising:

a chamber for receiving gas and holding gas under pressure to be released for the generation of an acoustic pulse, said chamber being formed of rigid wall structure to be immersed in water, said chamber having a first end and an outlet port spaced from said first end, movable valve means supported for movement between a closed position and an open position for closing and opening said outlet port, respectively, said valve means preventing the release of pressurized gas from said chamber when said valve means is in said closed position, said valve means being formed of magnetic material, an electromagnet including structure formed of magnetic material and an electrical coil coupled to said wall structure at a position spaced from said first end, said electromagnet being responsive to electric current flow through said coil for applying a magnetic holding force to said valve means to prevent pressurized gas in said chamber from moving said valve means to said open position, said electromagnetic being responsive to a decrease in electric current flow through said coil for decreasing said holding force to allow pressurized gas in said chamber to move said valve means rapidly to said open position for release of pressurized gas from said chamber by way of said outlet port to generate an acoustic pulse in water, said structure of said electromagnet having a first surface facing said valve means, said valve means having a surface facing said first surface and movable toward and away from said first surface when said valve means is moved to said closed and to said open positions, respectively, at least a portion of said surface of said valve means closing said outlet port when said valve means is in said closed position, and means for returning said valve means to said closed position following the generation of an acoustic pulse.

22. The acoustic source of claim 21 wherein:

said valve means is supported to allow pressurized gas to flow from said chamber through said outlet port and between said first surface and said surface of said valve means when said valve means is moved to said open position.

23. The acoustic source of claim 21 wherein:

said outlet port extends through said structure of said electromagnet.

24. The acoustic source of claim 23 wherein:

said valve means is supported to allow pressurized gas to flow from said chamber by way of said outlet port and between said first surface and said surface of said valve means when said valve means is moved to said open position.

25. An acoustic source for generating in water acoustic pulses useful in marine seismic operations comprising:

a chamber formed of rigid wall structure to be immersed in water, said chamber having a first end and an outlet port spaced from said first end, movable valve means supported for movement between a closed position and an open position for closing and opening said outlet port, respectively, means for introducing a fluid into said chamber when said valve means is in a closed position to form a high gas pressure in said chamber, said valve means comprising structure formed of magnetic material, an electromagnet comprising structure formed of magnetic material and an electrical coil for applying a magnetic holding force to said valve means to hold said valve means closed against said high gas pressure in said chamber, said electromagnet being controllable to decrease said holding force to allow said high gas pressure to move said valve means to said open position to release said high gas pressure rapidly from said chamber by way of said outlet port for flow into the water to generate an acoustic pulse, and means for returning said valve means to said closed position following the generation of an acoustic pulse.

26. The acoustic source of claim 25 wherein:

said structure of said electromagnet is coupled to said wall structure of said chamber at a position spaced from said first end, said structure of said electromagnet has a first surface facing said valve means, said valve means has a surface facing said first surface and movable toward and away from said first surface when said valve means is moved to said closed and to said open positions, respectively, said structure of said electromagnet surrounding said outlet port, the cross-sectional area of said outlet port being smaller than the area of said surface of said valve means, said structure of said electromagnet preventing said valve means from entering the interior of said chamber whereby said chamber is free of movable valve structure.

27. The acoustic source of claim 25 wherein:

said structure of said electromagnet is coupled to said wall structure of said chamber at a position spaced from said first end, said structure of said electromagnet having a first surface facing said valve means, said valve means having a surface facing said first surface and movable toward and away from said first surface when said valve means is moved to said closed and to said open positions, respectively, when said source is immersed in water, said first surface and said surface of said valve means being exposable to water at least when said valve means is moved to said open position, at least a portion of said surface of said valve means closing said outlet port when said valve means is in said closed position.

28. The coustic source of claim 27 wherein:

said outlet port extends through said structure forming said electromagnet, said valve means being supported to allow said high gas pressure to flow from said chamber by way of said outlet port and between said first surface and said surface of said valve means when said valve means is moved to said open position.

29. The coustic source of claim 28 comprising:

seal means for forming a fluid seal between said first surface and said surface of said valve means and around said outlet port when said valve means is in said closed position, said structure of said electromagnet forming a portion of said wall structure of said chamber for confining said high gas pressure in said chamber when said valve means is in said closed position, said valve means being supported for movement adjacent said electromagnet when said valve means is moved to said closed position whereby at least a portion of said surface of said valve means abuts against at least a portion of said first surface of said electromagnet, said valve means being supported for movement away from said first end and said electromagnet and in the direction of flow of gas through said outlet port from said chamber when said valve means is moved to said open position.

30. The acoustic source of claim 29 wherein:

said seal means is located to form said seal at a position spaced inwardly from the outer boundaries of said first surface and said surface of said valve means whereby gas from said chamber flows through said outlet port and radially outward between said first surface and said surface of said valve means when said valve means is moved to said open position.

31. The decelerating source of claim 30 comprising:

valve decelerating means for decelerating said valve means as it moves to said open position, said decelerating means being located at a position whereby said valve means moves toward said decelerating means when said valve means moves to said open position, said valve decelerating means comprising structure forming a region for containing water for release from said region between said valve means and said structure of said decelerating means as said valve means moves to said open position, said means for returning said valve means to said closed position being located on the side of said valve means opposite said surface of said valve means which faces said first surface.

32. An acoustic source for generating acoustic pulses in water for marine seismic exploration operations comprising:

a chamber for receiving gas and holding gas under pressure to be released for the generation of an acoustic pulse, said chamber being formed of rigid wall structure to be immersed in water, said chamber having a first end and an outlet port, annularly shaped ferromagnetic structure coupled to said wall structure at a position spaced from said first end, said outlet port extending through said annularly shaped ferromagnetic structure, movable valve means formed of ferromagnetic structure supported for movement between a closed position adjacent said annularly shaped ferromagnetic structure and an open position for closing and opening said outlet port, respectively, said valve means preventing the release of pressurized gas from said chamber when said valve means is in said closed position, an electrical coil associated with said annularly shaped ferromagnetic structure to form an electromagnet:
  (a) for forming a magnetic holding force when electric current is applied to said coil for application of said force to said ferromagnetic structure of said valve means for holding said valve means in said closed position against pressurized gas in said chamber, and
  (b) responsive to decreased current flow for decreasing said holding force to allow pressurized gas in said chamber to move said valve means to said open position to released pressurized gas rapidly from said chamber by way of said outlet port for flow into the water to generate an acoustic pulse, and means for returning said valve means to said closed position following the generation of an acoustic pulse for the generation of subsequent acoustic pulses.

33. The acoustic source of claim 32 wherein:

said outlet port extends centrally through said annularly shaped ferromagnetic structure, said chamber having an axis passing centrally through said outlet port, said valve means being supported for linear movement along a line in the direction of said axis between said closed and open positions, said annularly shaped ferromagnetic structure having a first surface facing said valve means, said valve means having a surface facing said first surface and movable adjacent said first surface when said valve means is moved to said closed position whereby at least a portion of said surface of said valve means abuts against at least a portion of said first surface of said annularly shaped ferromagnetic structure, annular seal means for forming a fluid seal between said first surface and said surface of said valve means and around said outlet port when said valve means is in said closed position, an annular slot formed in said annularly shaped ferromagnetic structure around said outlet port, said electrical coil being located in said slot and surrounding said outlet port, said valve means being supported for movement away from said first end and away from said first surface of said annularly shaped ferromagnetic structure when said valve means is moved to said open position, said valve means being supported to allow pressurized gas to flow from said chamber by way of said outlet port and between said first surface and said surface of said valve means when said valve means is moved to said open position.

34. The acoustic source of claim 33 wherein:

said annular seal means is located radially inwardly from said annular slot.

35. The method of generating acoustic energy in a body of water by rapidly releasing high gas pressure from a container comprising the steps of:

sealing an opening in said container by the application of electromagnetic force, pressurizing said container with high gas pressure, and suddenly reducing said electromagnetic force to break said seal and release said high gas pressure from said container.

36. A system for carrying out marine seismic operations useful in the investigation of underwater formations comprising:

a tow vessel for towing an acoustic source in water for generating repetitive acoustic pulses in water, said acoustic source comprising a gas pressure chamber formed of rigid wall structure having an outlet port for releasing high gas pressure rapidly from said chamber to generate an acoustic pulse in water; valve means movable to open and closed positions for opening and closing said outlet port, respectively; an electromagnet comprising an electrical coil for producing a magnetic holding force for application to said valve means in opposition to forces applied to said valve means by high gas pressure in said chamber; and valve retract means for moving said valve to said closed position following the generation of an acoustic pulse, a source of electrical energy to be supported by said tow vessel coupled to said electrical coil by way of electrical conductors, a source of chamber pressurizing fluid to be supported by said tow vessel, conduit means leading from said source of fluid to said chamber, means for introducing, by way of said conduit means, said fluid into said chamber when said valve means is in said closed position to form a high gas pressure in said chamber, and means for controlling the application of electrical energy from said source of electrical energy to said electrical coil.

References Cited

UNITED STATES PATENTS

| 1,753,368 | 4/1930 | Du Bois-Reymond et al. _ 181—.5 |
| 3,322,232 | 5/1967 | Chalmers et al. _____ 181—.5 |
| 3,327,264 | 6/1967 | Rodaway _____ 251—129 X |
| 3,368,789 | 2/1968 | Martin _____ 251—141 |
| 3,379,273 | 4/1968 | Chelminski _____ 181—.5 |
| 3,381,931 | 5/1968 | Boonshaft et al. _____ 251—30 |

BENJAMIN A. BORCHELT, Primary Examiner

T. H. WEBB, Assistant Examiner

U.S. Cl. X.R.

340—7

PO-1050
(5/69)

UNITED STATES PATENT OFFICE
CERTIFICATE OF CORRECTION

Patent No. 3,506,085      Dated April 14, 1970

Inventor(s) George B. Loper

It is certified that error appears in the above-identified patent and that said Letters Patent are hereby corrected as shown below:

Column 3, line 30, "n" should read --in--.
Column 7, line 3, "39a" should read --39b--;
         line 38, "emplyoed" should read --employed--.
Column 9, line 40, the comma (,) should be deleted after "position".
Column 10, line 66, "closed" should be deleted.
Column 11, line 19, a period (.) should be inserted after "coil".
Column 14, line 10, "coustic" should be --acoustic--;
         line 18, "coustic" should be --acoustic--;
         line 46, "decelerating source" should be --acoustic source--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents